(12) United States Patent
Hashizume

(10) Patent No.: US 7,444,804 B2
(45) Date of Patent: Nov. 4, 2008

(54) EXHAUST GAS CONTROL APPARATUS FOR INTERNAL COMBUSTION ENGINE

(75) Inventor: Takeshi Hashizume, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/583,777

(22) PCT Filed: Jul. 7, 2005

(86) PCT No.: PCT/IB2005/001930

§ 371 (c)(1),
(2), (4) Date: Jun. 21, 2006

(87) PCT Pub. No.: WO2006/008600

PCT Pub. Date: Jan. 26, 2006

(65) Prior Publication Data

US 2007/0186536 A1 Aug. 16, 2007

(30) Foreign Application Priority Data

Jul. 9, 2004 (JP) .............................. 2004-203185

(51) Int. Cl.
*F01N 3/00* (2006.01)
(52) U.S. Cl. .............................. 60/297; 60/278; 60/280; 60/295
(58) Field of Classification Search .................... 60/278, 60/280, 286, 295, 297, 311
See application file for complete search history.

(56) References Cited

U.S. PATENT DOCUMENTS 5,440,880 A * 8/1995 Ceynow et al. ............ 60/605.2
6,427,436 B1 * 8/2002 Allansson et al. ............ 60/274
6,742,335 B2 * 6/2004 Beck et al. .................. 60/605.2
6,817,174 B1 * 11/2004 Igarashi et al. ................ 60/295
6,886,544 B1 * 5/2005 Bui ........................ 123/568.18
6,981,370 B2 * 1/2006 Opris et al. .................... 60/311
7,251,932 B2 * 8/2007 Huang .......................... 60/297

FOREIGN PATENT DOCUMENTS

| EP | 0 596 855 A1 | 5/1994 |
| EP | 1 420 159 A2 | 5/2004 |
| JP | A 4-22705 | 1/1992 |
| JP | U 6-34122 | 5/1994 |
| JP | A 6-257519 | 9/1994 |
| JP | B2 2675405 | 7/1997 |
| JP | A 11-210449 | 8/1999 |
| JP | A 2002/276405 | 9/2002 |
| WO | WO 99/15773 | 4/1999 |
| WO | WO 03/102391 A1 | 12/2003 |

* cited by examiner

*Primary Examiner*—Binh Q Tran
(74) *Attorney, Agent, or Firm*—Oliff & Berridge, PLC

(57) ABSTRACT

In an exhaust gas control apparatus for an internal combustion engine, in a case where an internal combustion engine is in a high load operating state while a PM trapping ability forcible recovery process for a particulate filter is being performed, EGR gas is caused to flow back from a portion downstream of the particulate filter in an exhaust passage to a portion upstream of a compressor housing in an intake passage, whereby the EGR gas is cooled by an intercooler. In a case where the internal combustion engine is in a low load operating state while the PM trapping ability forcible recovery process is being performed, the EGR gas is caused to flow back from the portion downstream of the particulate filter in the exhaust passage to a portion downstream of the intercooler in the intake passage, whereby the EGR gas is prevented from being unnecessarily cooled.

6 Claims, 3 Drawing Sheets

EXHAUST GAS CONTROL APPARATUS FOR INTERNAL COMBUSTION ENGINE

The disclosure of Japanese Patent Application No. 2004-203185 filed on Jul. 9, 2004, including the specification, drawings and abstract is incorporated herein by reference in its entirety.

BACKGROUND OF THE INVENTION

1. Field of the Invention

The invention relates to an exhaust gas control apparatus for an internal combustion engine. More particularly, the invention relates to an exhaust gas control apparatus including a particulate filter and an EGR mechanism.

2. Description of the Related Art

Recently, an exhaust gas control apparatus for an internal combustion engine including a particulate filter and an EGR mechanism has been widely used. Japanese Patent Application Publication No. JP (A) 4-22705 discloses an example of such an exhaust gas control apparatus, in which EGR gas is taken out from a portion downstream of a particulate filter. Also, Japanese Utility Model Application Publication No. 6-34122 and Japanese Patent No. 2675405 disclose related art.

Meanwhile, in the aforementioned related art, sufficient consideration is not given to which portion should be supplied with the EGR gas that is taken out from the portion downstream of the particulate filter.

SUMMARY OF THE INVENTION

It is an object of the invention to provide a technology in which in an exhaust gas control apparatus including a particulate filter and an EGR mechanism, EGR gas can be caused to appropriately flow back to an intake system.

According to an aspect of the invention, when a trapping ability of a particulate filter is forcibly recovered (hereinafter, this process will be referred to as "PM trapping ability forcible recovery process"), EGR gas is taken out from a portion downstream of the particulate filter, and a portion to which the EGR gas is caused to flow back is changed according to a load of an internal combustion engine.

In a case where a supercharger and an intercooler are provided in an intake passage of an internal combustion engine, when a load of the internal combustion engine is equal to or lower than a predetermined load while the PM trapping ability forcible recovery process is being performed, exhaust gas is caused to flow back from a portion downstream of the particulate filter in an exhaust passage to a portion downstream of the intercooler in an intake passage. When the load of the internal combustion engine is higher than the predetermined load, the exhaust gas is caused to flow back from the portion downstream of the particulate filter in the exhaust passage to a portion upstream of the supercharger in the intake passage.

The load of the internal combustion engine may be obtained based on an accelerator pedal operation amount. Further, it may be determined that the load of the internal combustion engine is high when the accelerator pedal operation amount is larger than a predetermined amount, and it may be determined that the load of the internal combustion engine is low when the accelerator pedal operation amount is equal to or smaller than the predetermined amount.

While the PM trapping ability forcible recovery process is being performed, the temperature of the particulate filter is increased to 600° C. or higher, and particulate matter (hereinafter, referred to as "PM") trapped in the particulate filter is oxidized and removed.

Since heat is generated when the PM is oxidized, the temperature of the particulate filter may be further increased, and the particulate filter may be deteriorated. However, when a certain amount of exhaust gas flows into the particulate filter, heat of the particulate filter is removed by the exhaust gas, and thus an excessive increase in the temperature of the particulate filter is suppressed.

Meanwhile, when the EGR gas is taken out from the portion upstream of the particulate filter while the PM trapping ability forcible recovery process is being performed, the amount of the exhaust gas flowing into the particulate filter is decreased. Therefore, the temperature of the particulate filter may be excessively increased. Therefore, it is conceivable to prohibit the exhaust gas from being recirculated while the PM trapping ability forcible recovery control is being performed. However, if the exhaust gas is prohibited from being recirculated while the PM trapping ability forcible recovery process is being performed, an amount of generated NOx may be increased.

Accordingly, by taking out the EGR gas from the portion downstream of the particulate filter while the PM trapping ability forcible recovery process is being performed, the EGR gas can be recirculated without decreasing the amount of the exhaust gas flowing into the particulate filter. Thus, it is possible to suppress both of generation of NOx and an excessive increase in the temperature of the particulate filter.

Also, in a case where relatively low-temperature EGR gas is supplied to the internal combustion engine when the internal combustion engine is in a low load operating state, combustion may become unstable due to an excessive decrease in a combustion temperature and the like.

Meanwhile, in a case where relatively high-temperature EGR gas is supplied to the internal combustion engine when the internal combustion engine is in a high load operating state, an amount of intake air may be decreased to a large extent. Also, since a compression end temperature is increased due to heat of the EGR gas, ignition timing may be changed to inappropriate timing. Further, generation of smoke and the like may be induced due to the decrease in the amount of intake air, the inappropriate change in the ignition timing, and the like. Particularly, a temperature of the exhaust gas at the portion downstream of the particulate filter is likely to become high while the PM trapping ability forcible recovery process is being performed. Therefore, the amount of intake air is likely to decrease and the compression end temperature is likely to increase, and thus smoke is likely to be generated.

Accordingly, in a case where the load of the internal combustion engine is equal to or lower than the predetermined load while the PM trapping ability forcible recovery process is being performed, the EGR gas is caused to flow back to the portion downstream of the intercooler in the intake passage. In this case, the EGR gas is prevented from being unnecessarily cooled by the intercooler. Therefore, evaporation (atomization) of the fuel can be promoted using heat of the EGR gas, and an excessive decrease in the combustion temperature can be suppressed.

Meanwhile, in a case where the load of the internal combustion engine is higher than the predetermined load while the PM trapping ability forcible recovery process is being performed, the EGR gas is caused to flow back to the portion upstream of the intercooler in the intake passage. However, since a pressure at a portion between the supercharger and the intercooler may become higher than a pressure in the exhaust passage while the internal combustion engine is in the high load operating state, it is preferable that the EGR gas should be caused to flow back to the portion upstream of the supercharger in the intake passage.

In this case, since the EGR gas is cooled by the intercooler, relatively low-temperature EGR gas is supplied to the internal combustion engine. As a result, a decrease in the amount of intake air and an excessive increase in the compression end temperature are suppressed, and thus generation of smoke and the like is suppressed.

Accordingly, in the exhaust gas control apparatus for an internal combustion engine according to the invention, it is possible to prevent an increase in generated NOx and an excessive increase in the temperature of the particulate filter. In addition, it is possible to appropriately stabilize the operating state of the internal combustion engine.

Also, the exhaust gas control apparatus for an internal combustion engine may include a first EGR gas take out pipe which is connected to the exhaust passage at the portion downstream of the particulate filter; a second EGR gas take out pipe which is connected to the exhaust passage at a portion upstream of the particulate filter; a first EGR gas supply pipe which is connected to the intake passage at the portion upstream of the supercharger; a second EGR gas supply pipe which is connected to the intake passage at a portion downstream of the intercooler; a common EGR gas pipe whose one end is divided into two portions one of which is connected to the first EGR gas take out pipe and the other of which is connected to the second EGR gas take out pipe, and whose other end is divided into two portions one of which is connected to the first EGR gas supply pipe and the other of which is connected to the second EGR gas supply pipe; a first three-way valve which is provided at the one end of the common EGR gas pipe; and a second three-way valve which is provided at the other end of the common EGR gas pipe.

In the exhaust gas control apparatus for an internal combustion engine thus configured, in a case where EGR gas is caused to flow back from the portion downstream of the particulate filter in the exhaust passage to the portion downstream of the intercooler in the intake passage (i.e., in a case where the internal combustion engine is in the low load operating state), the first three-way valve is operated so as to provide communication between the first EGR gas take out pipe and the common EGR gas pipe, and the second three-way valve is operated so as to provide communication between the second EGR gas supply pipe and the common EGR gas pipe.

In a case where the EGR gas is caused to flow back from the portion downstream of the particulate filter in the exhaust passage to the portion upstream of the supercharger in the intake passage (i.e., in a case where the internal combustion engine is in the high load operating state), the first three-way valve is operated so as to provide communication between the first EGR gas take out pipe and the common EGR gas pipe, and the second three-way valve is operated so as to provide communication between the first EGR gas supply pipe and the common EGR gas pipe.

With the aforementioned configuration, it is possible to simplify the configuration of the exhaust gas control apparatus. Thus, it is possible to make it easier to install the exhaust gas control apparatus in a vehicle, and to reduce production cost thereof.

The common EGR gas pipe may be provided with an EGR cooler, a bypass passage which bypasses the EGR cooler, and a passage switching valve which stops a flow of the exhaust gas through the EGR cooler and a flow of the exhaust gas through the bypass passage.

In the exhaust gas control apparatus for an internal combustion engine thus configured, in the case where the EGR gas is caused to flow back from the portion downstream of the particulate filter in the exhaust passage to the portion downstream of the supercharger in the intake passage, the passage switching valve is operated so that the a flow of the exhaust gas through the EGR cooler is stopped (i.e., the exhaust gas flows through the bypass passage). In this case, the EGR gas is not cooled by the EGR cooler or the intercooler. As a result, the temperature of the EGR gas supplied to the internal combustion engine becomes high. Therefore, evaporation (atomization) of the fuel can be promoted, and an unnecessary decrease in the combustion temperature can be suppressed. Accordingly, the combustion is stabilized.

Also, in the case where the EGR gas is caused to flow back from the portion downstream of the particulate filter in the exhaust passage to the portion upstream of the supercharger in the intake passage, the passage switching valve is operated so that a flow of the exhaust gas through the bypass passage is stopped (i.e., the exhaust gas flows through the common EGR gas pipe). In this case, the EGR gas is cooled by the EGR cooler and the intercooler. As a result, it is possible to reliably decrease the temperature of the EGR gas supplied to the internal combustion engine, and to suppress a decrease in the amount of intake air and an excessive increase in the compression end temperature.

While the PM trapping ability forcible recovery process is not being performed, the EGR gas may be taken out from the portion upstream of the particulate filter in the exhaust passage, and the EGR gas may be caused to flow back to the portion downstream of the intercooler in the intake passage. When the EGR gas is taken out from the portion upstream of the particulate filter in the exhaust passage, the amount of the exhaust gas flowing into the particulate filter is decreased, and accordingly, the amount of the PM flowing into the particulate filter is decreased. Therefore, it is possible to decrease the frequency with which the PM trapping ability forcible recovery process is performed.

In the aforementioned exhaust gas control apparatus for an internal combustion engine, when the PM trapping ability forcible recovery process of the particulate filter is performed, it is possible to perform the EGR control while suppressing an excessive increase in the temperature of the particulate filter and a decrease in stability of combustion.

BRIEF DESCRIPTION OF THE DRAWINGS

The above mentioned and other features, advantages, technical and industrial significance of this invention will be better understood by reading the following detailed description of exemplary embodiments of the invention, when considered in connection with the accompanying drawings, in which.

DETAILED DESCRIPTION OF THE EXEMPLARY EMBODIMENTS

In the following description and the accompanying drawings, the present invention will be described in more detail in terms of exemplary embodiments.

Figure 1:
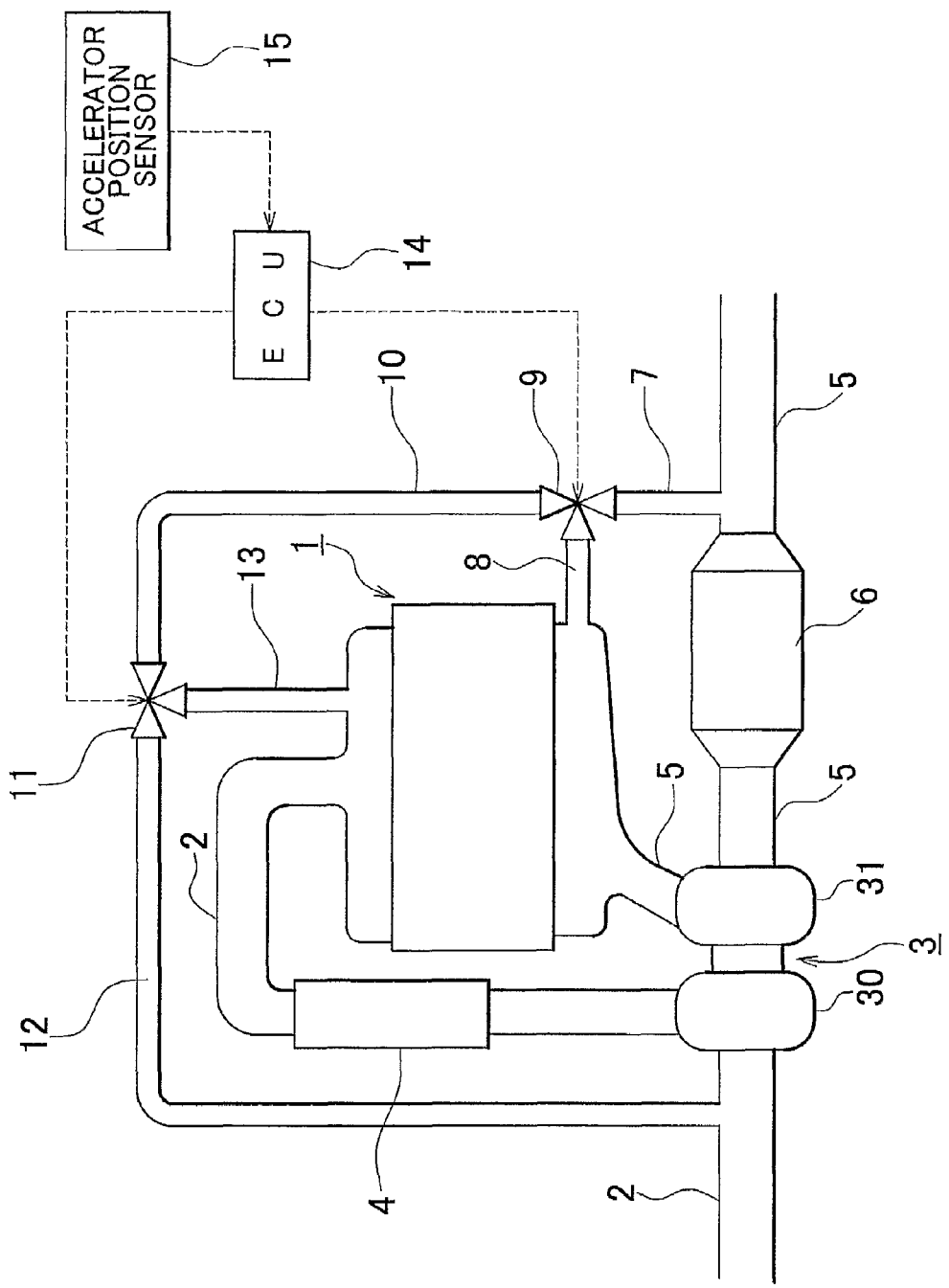
FIG. 1 is a schematic diagram showing a configuration of an internal combustion engine to which an embodiment of the invention is applied.

Hereinafter, an exhaust gas control apparatus according to an exemplary embodiment of the invention will be described with reference to the accompanying drawings. FIG. 1 is a schematic diagram showing a configuration of an internal combustion engine to which an embodiment of the invention is applied. An internal combustion engine 1 shown in FIG. 1 is a compression ignition internal combustion engine (diesel engine).

An intake passage 2 is connected to the internal combustion engine 1. In the intake passage 2, a compressor housing 30 of a centrifugal supercharger (in this embodiment, a turbocharger) 3 is provided. An intercooler 4 is provided at a portion downstream of the compressor housing 30 in the intake passage 2.

Also, an exhaust passage 5 is connected to the internal combustion engine 1. A turbine housing 31 of the turbocharger 3 is provided in the exhaust passage 5. A particulate filter 6 is provided at a portion downstream of the turbine housing 31 in the exhaust passage 5.

A first EGR gas take out pipe 7 is connected to the exhaust passage 5 at a portion downstream of the particulate filter 6. A second EGR gas take out pipe 8 is connected to the exhaust passage 5 at a portion upstream of the turbine housing 31. The first and second EGR gas take out pipes 7 and 8 are connected to a first three-way valve 9.

The first three-way valve 9 is connected to a common EGR gas pipe 10, as well as to the first and second EGR gas take out pipes 7 and 8. The common EGR gas pipe 10 is connected to a second three-way valve 11.

The second three-way valve 11 is connected to a first EGR gas supply pipe 12 and a second EGR gas supply pipe 13, as well as to the common EGR gas pipe 10. The first EGR gas supply pipe 12 is connected to the intake pipe 2 at a portion upstream of the compressor housing 30. The second EGR gas supply pipe 13 is connected to the intake passage 2 at a portion downstream of the intercooler 4.

An ECU 14 is provided for the internal combustion engine 1 having the aforementioned configuration. The ECU 14 is an arithmetic and logic circuit including a CPU, ROM, RAM, a backup RAM, and the like.

The ECU 14 is electrically connected to the aforementioned first and second three-way valves 9 and 11. Thus, the ECU 14 can control the first and second three-way valves 9 and 11. Also, the ECU 14 is electrically connected to various sensors such as an accelerator position sensor 15. Signals output from the various sensors are input to the ECU 14.

The ECU 14 performs an EGR control that is a main point of the invention, based on the signals output from the various sensors, in addition to known controls such as a fuel injection control. Hereinafter, the EGR control will be described with reference to FIG. 2.

Figure 2:
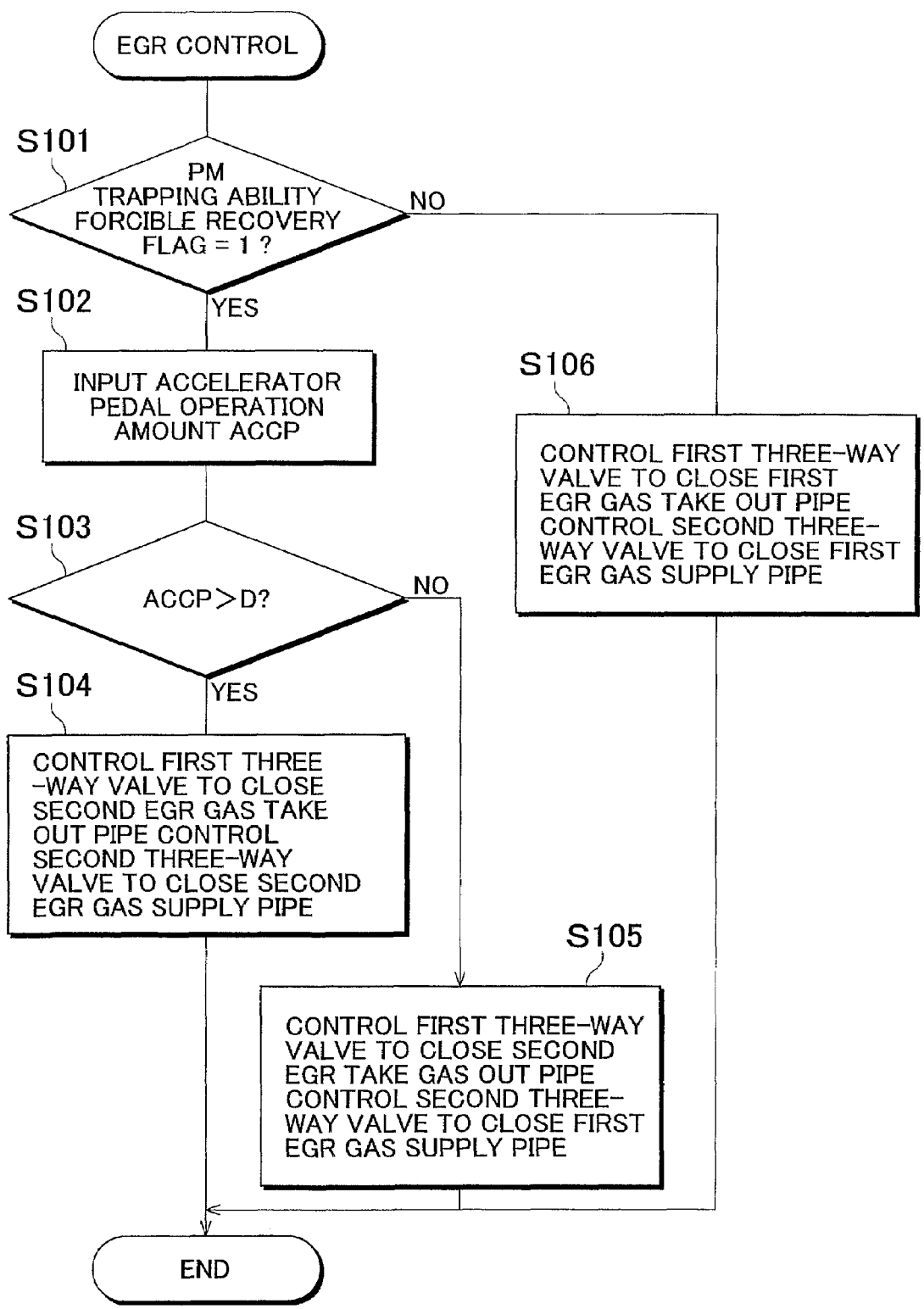
FIG. 2 is a flowchart showing an EGR control routine.

FIG. 2 is a flowchart showing an EGR control routine. The EGR control routine is stored in the ROM of the ECU 14 in advance. The EGR control routine is performed at predetermined time intervals as an interrupt routine.

In the EGR control routine, first, in step S101, the ECU 14 determines whether a value of a PM trapping ability forcible recovery flag is "1". The PM trapping ability forcible recovery flag is a storage area that is set in advance in the RAM or the like. When the PM trapping ability forcible recovery process is started, the value "1" is stored in this storage area. When the PM trapping ability forcible recovery process is completed, the value "0" is stored in this storage area.

In the PM trapping ability forcible recovery process, the particulate filter 6 is forcibly placed in a lean atmosphere at a high temperature of approximately 600° C. or higher, whereby particulate matter (hereinafter, referred to as "PM") trapped in the particulate filter 6 is oxidized and removed.

When it is determined that the value of the PM trapping ability forcible recovery flag is not "1" (i.e., the value is "0") in step S101, the ECU 14 performs a normal EGR control in step S106.

In the normal EGR control, the ECU 14 controls the first three-way valve 9 so as to close the first EGR gas take out pipe 7, thereby providing communication between the second EGR gas take out pipe 8 and the common EGR gas pipe 10. In addition, the ECU 14 controls the second three-way valve 11 so as to close the first EGR gas supply pipe 12, thereby providing communication between the second EGR gas supply pipe 13 and the common EGR gas pipe 10.

In this case, EGR gas is caused to flow back from the portion upstream of the turbine housing 31 in the exhaust passage 5 to the portion downstream of the intercooler 4 in the intake passage 2.

In a case where the EGR gas is taken from the portion upstream of the particulate filter 6 in the exhaust passage 5 while the PM trapping ability forcible recovery process is not being performed, a flow rate of exhaust gas flowing into the particulate filter 6 is decreased, and accordingly an amount of the PM flowing into the particulate filter 6 is decreased. As a result, a frequency with which the PM trapping ability forcible recovery process is performed is decreased, and fuel efficiency is improved.

Meanwhile, when it is determined that the value of the PM trapping ability forcible recovery flag is "1" in step S101, a signal (i.e., an accelerator pedal operation amount ACCP) output from the accelerator position sensor 15 is input to the ECU 14 in step S102

In step S103, the ECU 14 determines whether the accelerator pedal operation amount ACCP that is input in step S102 is larger than a predetermined amount D.

When the ECU 14 determines that the accelerator pedal operation amount ACCP is larger than the predetermined amount D in step S103, the ECU 14 determines that an operating state of the internal combustion engine 1 is in a high load operating region. Then, the ECU 14 performs step S104.

In step S104, the ECU 14 controls the first three-way valve 9 so as to close the second EGR gas take out pipe 8, thereby providing communication between the first EGR gas take out pipe 7 and the common EGR gas pipe 10. In addition, the ECU 14 controls the second three-way valve 11 so as to close the second EGR gas supply pipe 13, thereby providing communication between the first EGR gas supply pipe 12 and the common EGR gas pipe 10.

In this case, the EGR gas is caused to flow back from the portion downstream of the particulate filter 6 in the exhaust passage 5 to the portion upstream of the compressor housing 30 in the intake passage 2.

When the EGR gas is taken out from the portion downstream of the particulate filter 6 in the exhaust passage 5 while the PM trapping ability forcible recovery process is being performed, the EGR gas can be recirculated without decreasing the flow rate of the exhaust gas passing through the particulate filter 6. Therefore, it is possible to suppress an amount of generated NOx, while suppressing an excessive increase in the temperature of the particulate filter 6.

In a case where the internal combustion engine 1 is in the high load operating state while the PM trapping ability forcible recovery process is being performed, the temperature of the EGR may increase to an extremely high temperature. In this case, if the high-temperature EGR gas were supplied to the portion downstream of the intercooler 4 in the intake passage 2, an amount of discharged smoke would be increased due to a decrease in an amount of intake air and an increase in a compression end temperature.

However, in this embodiment, since the EGR gas is supplied to the portion upstream of the compressor housing 30 in the intake passage 2, the EGR gas is cooled by the intercooler 4. As a result, it is possible to suppress a decrease in the amount of intake air and an increase in the compression end temperature, and to suppress an increase in the amount of discharged smoke, and the like.

Accordingly, in the case where the internal combustion engine 1 is in the high load operating state while the PM trapping ability forcible recovery process is being performed, the EGR gas is caused to flow back from the portion downstream of the particulate filter 6 in the exhaust passage 5 to the portion upstream of the compressor housing 30 in the intake passage 2. Thus, it is possible to suppress generation of NOx, while suppressing an excessive increase in the temperature of the particulate filter 6, generation of smoke, and the like.

Referring again to FIG. 2, when the ECU 14 determines that the accelerator pedal operation amount ACCP is equal to or smaller than the predetermined amount D (i.e., ACCP≦D) in step S103, the ECU 14 determines that the operating state of the internal combustion engine 1 is in a low load operating region, and performs step S105.

In step S105, the ECU 14 controls the first three-way valve 9 so as to close the second EGR gas take out pipe 8, thereby providing communication between the first EGR gas take out pipe 7 and the common EGR gas pipe 10. In addition, the ECU 14 controls the second three-way valve 11 so as to close the first EGR gas supply pipe 12, thereby providing communication between the second EGR gas supply pipe 13 and the common EGR gas pipe 10.

In this case, the EGR gas is taken out from the portion downstream of the particulate filter 6 as well as in the case where the internal combustion engine is in the high load operating state. However, the EGR gas is supplied to the portion downstream of the intercooler 5 in the intake passage 2.

In the case where the internal combustion engine 1 is in the low load operating state while the PM trapping ability forcible recovery process is being performed, the compression end temperature is likely to decrease, and a combustion temperature is likely to decrease. Therefore, atomization of the fuel is unlikely to be promoted. Particularly when the EGR gas is supplied to the internal combustion engine 1, the compression end temperature is decreased, and the combustion temperature is decreased. Therefore, stability of combustion in the internal combustion engine 1 may be deteriorated.

However, in this embodiment, since the EGR gas is supplied to the portion downstream of the intercooler 4 in the intake passage 2, the EGR gas is prevented from being unnecessarily cooled. As a result, a decrease in the compression end temperature and a decrease in the combustion temperature are suppressed. Thus, stability of the combustion in the internal combustion engine 1 is improved.

According to the embodiment that has been described, since the EGR gas is taken out from the portion downstream of the particulate filter 6 in the exhaust passage while the PM trapping ability forcible recovery process is being performed, it is possible to recirculate the EGR gas while preventing an excessive increase in the temperature of the particulate filter 6. Further, according to the embodiment of the invention, since the portion to which the EGR gas is supplied is changed according to the load of the internal combustion engine 1 while the PM trapping ability forcible recovery process is being performed, it is possible to recirculate the EGR gas while appropriately stabilizing the combustion in the internal combustion engine 1.

Figure 3:
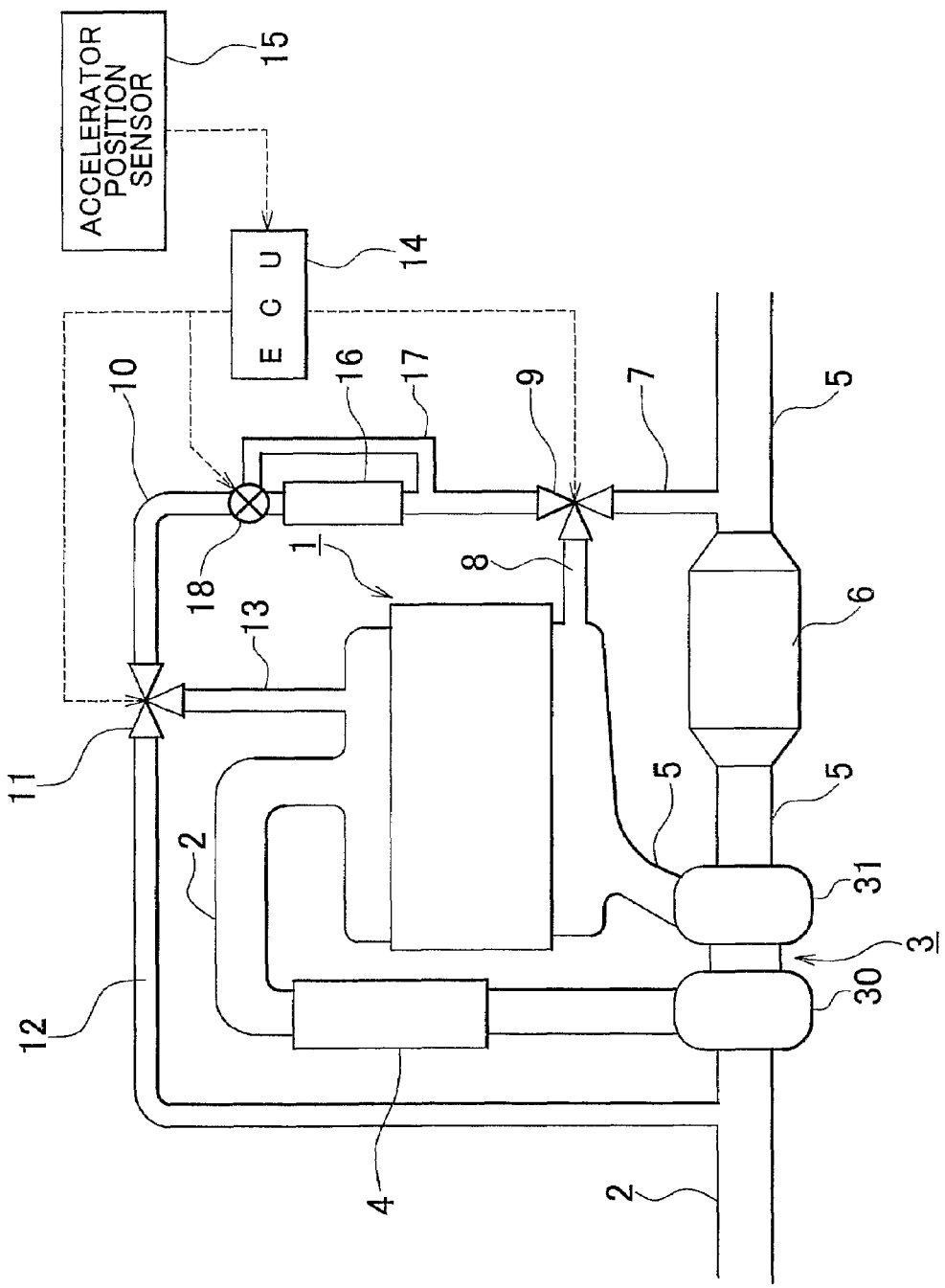
FIG. 3 is a diagram showing a configuration of an internal combustion engine to which another embodiment of the invention is applied.

In the embodiment, the exhaust gas control apparatus does not include an EGR cooler. However, as shown in FIG. 3, the common EGR gas pipe 10 may be provided with an EGR cooler 16, a bypass passage 17 which bypasses the EGR cooler 16, and a passage switching valve 18 which stops one of a flow of the EGR gas through the EGR cooler 16 and a flow of the EGR gas through the bypass passage 17.

In such a configuration in which the EGR cooler 16 is provided, in the case where the internal combustion engine 1 is in the high load operating state while the PM trapping ability forcible recovery process is being performed, the ECU 14 controls the first and second three-way valves 9 and 11 so that the EGR gas is caused to flow back from the portion downstream of the particulate filter 6 in the exhaust passage 5 to the portion upstream of the compressor housing 30 in the intake passage 2. In addition, the ECU 14 controls the passage switching valve 18 so that the EGR gas is caused to pass through the EGR cooler 16.

In this case, since the EGR gas is cooled by the EGR cooler 16 and the intercooler 4, the EGR gas can be reliably cooled. Also, in this case, it is possible to make a capacity of the EGR cooler small, as compared to the case where the EGR gas is cooled by only the EGR cooler 16.

In the case where the internal combustion engine 1 is in the low load operating state while the PM trapping ability forcible recovery process is being performed, the ECU 14 controls the first and second three-way valves 9 and 11 so that the EGR gas is caused to flow back from the portion downstream of the particulate filter 6 in the exhaust passage 5 to the portion downstream of the intercooler 4 in the intake passage 2. In addition, the ECU 14 controls the passage switching valve 18 so that the EGR gas is caused to flow through the bypass passage 17.

In this case, since the EGR gas is not cooled by the EGR cooler 16 or the intercooler 4, an amount of heat of the EGR is not decreased, and atomization of the fuel can be promoted, and the compression end temperature can be increased.

Accordingly, even in the exhaust gas control apparatus including the EGR cooler 16, the EGR gas can be appropriately recirculated while the PM trapping ability forcible recovery process is being performed. Further, since the common EGR gas pipe 10 is provided with the EGR cooler 16, the number of the EGR coolers 16 can be minimized, and the exhaust gas control apparatus can be prevented from becoming difficult to install in the vehicle.

The invention claimed is:

1. An exhaust gas control apparatus for an internal combustion engine, comprising:
   a particulate filter that is provided in an exhaust passage of the internal combustion engine;
   a supercharger that is provided in an intake passage of the internal combustion engine;
   an intercooler that is provided in a portion downstream of the supercharger in the intake passage;
   a filter recovery device that recovers a trapping ability of the particulate filter by increasing a temperature of the particulate filter;
   a load obtaining device that obtains a load of the internal combustion engine; and
   an Exhaust Gas Recirculation (EGR) control device that controls exhaust gas to flow back from a portion downstream of the particulate filter in the exhaust passage to a portion downstream of the intercooler in the intake passage without passing through the intercooler in a case where a load of the internal combustion engine is equal to or lower than a predetermined load, and for controlling the exhaust gas to flow back from the portion downstream of the particulate filter in the exhaust passage to a portion upstream of the supercharger in the intake passage in a case where the load of the internal combustion engine is higher than the predetermined load, while the trapping ability of the particulate filter is being recovered.

2. The exhaust gas control apparatus for an internal combustion engine, according to claim 1, further comprising:

a first EGR gas take out pipe that is connected to the exhaust passage at the portion downstream of the particulate filter;

a second EGR gas take out pipe that is connected to the exhaust passage at a portion upstream of the particulate filter;

a first EGR gas supply pipe that is connected to the intake passage at the portion upstream of the supercharger;

a second EGR gas supply pipe that is connected to the intake passage at the portion downstream of the intercooler;

a common EGR gas pipe whose one end is divided into two portions one of which is connected to the first EGR gas take out pipe and the other of which is connected to the second EGR gas take out pipe, and whose other end is divided into two portions one of which is connected to the first EGR gas supply pipe and the other of which is connected to the second EGR gas supply pipe;

a first three-way valve that is provided at the one end of the common EGR gas pipe; and a second three-way valve that is provided at the other end of the common EGR gas pipe, wherein while the trapping ability of the particulate filter is being recovered, in the case where the load of the internal combustion engine is equal to or lower than the predetermined load, the EGR control device controls the first three-way valve so as to provide communication between the first EGR gas take out pipe and the common EGR gas pipe, and controls the second three-way valve so as to provide communication between the second EGR gas supply pipe and the common EGR gas pipe, and in the case where the load of the internal combustion engine is higher than the predetermined load, the EGR control device controls the first three-way valve so as to provide communication between the first EGR gas take out pipe and the common EGR gas pipe, and controls the second three-way valve so as to provide communication between the first EGR gas supply pipe and the common EGR gas pipe.

3. The exhaust gas control apparatus for an internal combustion engine, according to claim 2, wherein the common EGR gas pipe is provided with an EGR cooler, a bypass passage that bypasses the EGR cooler, and a passage switching valve that stops one of a flow of the exhaust gas through the EGR cooler and a flow of the exhaust gas through the bypass passage; and while the trapping ability of the particulate filter is being recovered, in the case where the load of the internal combustion engine is equal to or lower than the predetermined load, the EGR control device controls the passage switching valve so as to stop the flow of the exhaust gas through the EGR cooler, and in the case where the load of the internal combustion engine is higher than the predetermined load, the EGR control device controls the passage switching valve so as to stop the flow of the exhaust gas through the bypass passage.

4. The exhaust gas control apparatus for an internal combustion engine, according to claim 1, wherein the load obtaining device obtains the load of the internal combustion engine based on an accelerator pedal operation amount of a vehicle.

5. The exhaust gas control apparatus for an internal combustion engine, according to claim 4, wherein the load obtaining device determines that the load of the internal combustion engine is high when the accelerator pedal operation amount is larger than a predetermined amount, and determines that the load of the internal combustion engine is low when the accelerator pedal operation amount is equal to or smaller than the predetermined amount.

6. The exhaust gas control apparatus for an internal combustion engine, according to claim 1, wherein while the trapping ability of the particulate filter is not being recovered, the EGR control device controls the exhaust gas to flow back from a portion upstream of the particulate filter in the exhaust passage to the portion downstream of the intercooler in the intake passage.

* * * * *